UNITED STATES PATENT OFFICE.

THOMAS B. OSBORNE, OF NEW HAVEN, CONNECTICUT, AND ROBERT W. CORNELISON, OF BLOOMFIELD, NEW JERSEY.

PROCESS OF EXTRACTING ZEIN.

SPECIFICATION forming part of Letters Patent No. 691,966, dated January 28, 1902.

Application filed May 23, 1900. Serial No. 17,756. (Specimens.)

*To all whom it may concern:*

Be it known that we, THOMAS B. OSBORNE, of the town of New Haven, county of New Haven, and State of Connecticut, and ROBERT W. CORNELISON, of the town of Bloomfield, county of Essex, and State of New Jersey, have invented a new and useful Process of Extracting Zein, of which the following is a specification.

Our process consists, essentially, in separating in any approved way the larger part of the starch from the corn, as in the manufacture of corn-starch, and it is also desirable, although not necessary, to remove the germs which contain most of the fatty substances of the grain and the bran or husks. The residue contains a larger percentage of proteids and a smaller percentage of starch than the meal of the whole corn, together with cellulose and other insoluble carbohydrates, and it may or may not contain the germs and bran. In the manufacture of starch as carried on at present processes are employed in which the germs and bran are separately recovered, and the starch is extracted from the ground endosperm or body of the grain. We prefer to use the residue left after the extraction of starch by such a process, in which case the residue is the remnant of the ground endosperm of the corn left after a large part of the starch has been extracted. The material should be treated in a moist or fresh condition, or, if dried, it should be dried at a temperature low enough to avoid cooking the starch granules and to avoid coagulating the proteids. Such material, whether moist or dried, as aforesaid, is treated with a dilute aqueous alkaline solution, which, if care be taken to avoid coagulating the proteid by excess of alkali, forms a soluble compound with the zein contained therein, from which combination the zein can be recovered unchanged. That part of the said material which does not pass into solution is then separated therefrom, and the alkaline solution is then precipitated by an acid or by a salt, care being again taken to avoid coagulating the zein by too great an excess of acid. The precipitate consists chiefly of the proteid known as "zein," which is soluble in alcohol and capable of a variety of uses in the mechanic arts—as, for example, glue, size, varnish, insulator of electricity, &c.

This process cannot be successfully applied to the ordinary gluten meal of commerce as we have found it in the market, because the heat applied in drying the gluten meal cooks the granules of starch, so that they form a voluminous mass with alkaline solution, and also because the proteid substances in the gluten meal are affected by the heat, so as to resist to some extent the action of alkali and so as to yield products largely insoluble in alcohol.

It will be understood that the zein cannot be recovered unchanged from the herein-described alkaline solution by evaporation. It is necessary to add a substance for which the alkali has a greater chemical affinity than it has for the zein or to salt it out of solution.

As compared with the process described in Patent No. 456,773, to Thomas B. Osborne, dated July 28, 1891, for process of extracting zein, the herein-described process posseses the advantage of dispensing with the use of an expensive solvent and with its partial recovery by distillation and of dispensing with the operation of concentrating solutions by evaporation. It also yields a larger percentage of zein at less cost, and, furthermore, the residue which is left after treatment with the alkaline solution is found to contain a percentage of starch approximately that of the original cornmeal, and it may be utilized again in the manufacture of starch.

In carrying out our invention we have found the following process satisfactory: We take the residue left after the manufacture of corn-starch and preferably the residue of a process in which the germs and bran have previously been separated from the rest of the cornmeal. Said residue may be used in its moist condition or it may be dried at a low temperature. In either case it is mixed with such a volume of water that the solid matter constitutes some four or five per cent. of the mixture. To the water or to the mixture is added enough caustic soda or caustic potash to impart to the mixture a decided alkaline reaction with phenol-phthalein; but care must be taken to prevent gelatinizing the starch or permanently converting the proteid into substances insoluble in alcohol by too great an excess of alkali. In practice we add alkali to the extent of about three to four per cent. of the solid matter and if added to the mixture dilute the alkali before adding it. The mixture is then agitated until thoroughly mixed and until the proteid constituents are taken up by the alkali. The mixture is then allowed to settle and the supernatant alkaline solution which contains the zein in combination with the alkali is drawn off or otherwise separated from the insoluble residue. The alkaline solution is then neutralized by the addition of hydrochloric or other acid or by the addition of a salt, such as ammonium chlorid or ferric chlorid, which will convert the alkali into a salt and at the same time will not by such reaction produce a soluble compound with zein. The zein being thus set free separates in the form of a precipitate. The zein may also be salted out of solution by adding a sufficient quantity of a neutral salt, such as sodium chlorid.

In the ordinary processes of manufacturing starch the residue left after the process of separating the starch has been carried as far as is economical still contains a considerable percentage of starch mixed with other constituents insoluble in water. After treatment with the alkaline solution, as above described, the percentage of starch left in the residue is found to be greatly increased, because of the withdrawal of the proteid constituents from said residue, and for this reason an additional portion of starch may be economically separated therefrom by any approved process.

When a process of manufacturing starch is employed in which the germs and bran have been previously separated, the residue after treatment with the alkaline solution consists largely of starch mixed with a percentage of cellulose and other insoluble carbohydrates and may be used for many purposes in place of pure starch without further treatment.

If the germs containing most of the fatty constituents of the corn are not removed, a portion of the fat is liable to remain in the alkaline solution, and when this takes place a mixture is formed which seriously interferes with the success of the process. Zein thus prepared is largely soluble in alcohol and not soluble in water. It is useful for many of the purposes for which glue is used and in solution has many of the properties of solutions of shellac and pyroxilin.

It is often desirable to use the zein while in its water-soluble combination with an alkali, and for this purpose we recommend the following process of producing a concentrated solution thereof: The zein is precipitated from the dilute alkaline solution already described by the addition of a slight excess of acid and when collected contains a considerable percentage of water. While in this condition we add, little by little, a four to five per cent. solution of caustic soda or potash or ammonia, stirring to avoid local overaction until the zein is taken up. A thick syrupy liquid may be thus produced, which can be used as a size, varnish, and for other purposes.

What we claim, and desire to secure by Letters Patent, is—

1. The process of producing a concentrated solution of the water-soluble compound of zein and alkali, which consists in treating the raw or uncooked residue left after the manufacture of corn-starch, with a dilute aqueous alkaline solution; separating said solution from the insoluble residue left after such treatment; precipitating the zein from said solution; and treating the precipitate with a comparatively concentrated alkaline solution, substantially as and for the purpose described.

2. The process of extracting zein, which consists in treating the raw or uncooked residue left after the manufacture of starch from Indian meal, with a dilute aqueous alkaline solution; separating the alkaline solution from the insoluble residue left after such treatment; precipitating the proteids from said solution; and extracting the precipitate with a solvent of zein, substantially as and for the purpose described.

In witness whereof we have hereunto set our hands this 19th day of May, 1900.

THOMAS B. OSBORNE.
ROBERT W. CORNELISON.

Witnesses:
 ELIZABETH K. PENDLETON,
 FREDERICK CRANE.